United States Patent [19]

Hashimoto

[11] 3,720,788

[45] March 13, 1973

[54] SIMULTANEOUS LANGUAGE TRANSLATION SYSTEM

[75] Inventor: Hideaki Hashimoto, Nakano-ku, Tokyo, Japan

[73] Assignee: Kabushiki Kaisha Prince Hotel, Tokyo, Japan

[22] Filed: Dec. 29, 1971

[21] Appl. No.: 213,257

[52] U.S. Cl. ....................................................179/1 B

[51] Int. Cl. ....................................................H04b 5/00

[58] Field of Search ........179/1 B; 35/35 C; 340/148, 340/150, 155

[56] References Cited

UNITED STATES PATENTS 3.596.009 7/1971 Clifford ..............................35/35 C 3,614,322 10/1971 Joslow ..............................179/1 B 3,199,226 8/1965 Joslow ..............................35/35 C 3,474,451 10/1969 Abel ..............................35/35 C

*Primary Examiner*—Kathleen H. Claffy

*Assistant Examiner*—Jon Bradford Leaheey

*Attorney*—Arthur G. Connolly et al.

[57] ABSTRACT

A simultaneous translation system used to enable interpretation from the language of a speaker into several different languages. A switching system and matrix circuit are used to connect the speaker to appropriate interpretation booths thereby enabling an interpreter to translate the speaker's language into the different appropriate language and a circuit for transmitting the speaker's language and the language of each active interpreter to a conference audience.

2 Claims, 2 Drawing Figures

FIG. 1. (PROIR ART)

SIMULTANEOUS LANGUAGE TRANSLATION SYSTEM

BACKGROUND OF THE INVENTION

The present invention relates to a new simultaneous translation system which is free from the inconveniences noted below in connection with conventional systems.

In the conventional practice of conference interpretation, if the official languages adopted at a conference do not include Japanese, for example, and in the course of the conference a necessity arises for translating Japanese, the interpreter must first translate Japanese into one of the official languages—say English, for example. Such a case of resorting to indirect translation using an intermediary language causes inconveniences requiring additional equipment and personnel and possibly temporarily modifying the audio-amplifying circuit. This results in a poor quality of interpretation service.

SUMMARY OF THE INVENTION

The object of the present invention is to provide a simultaneous translation system equipped with a selective circuit which is easy to operate and assists in interpretation at international conferences involving an intermediary translation of a speech in a non-official language of the conference.

An example of the selective circuit to be used is a matrix circuit. The matrix circuit itself is known, but it is the feature of this invention that the matrix circuit is designed freely variable. For instance, the original language is set on the abscissa for changeover control of the original language, while on the ordinate intersecting the abscissa the interpret order display and original language switch circuit at the interpreter panel is controlled. At the junction of the abscissa and ordinate, diode pins corresponding to the mode of interpre-tation and the number of original languages are set and thereby the current direction is changed from abscissa to ordinate. This feature of controlling the whole circuit and displaying the interpret orders for all the interpreter booths by operation of a single control switch is unprecedented in the conventional simultaneous translation systems.

BRIEF DESCRIPTION OF THE DRAWINGS

Novel features and advantages of the present invention in addition to those mentioned above will become apparent from a reading of the following detailed description in conjunction with the accompanying drawing wherein.

DETAILED DESCRIPTION OF THE INVENTION

Figure 1:
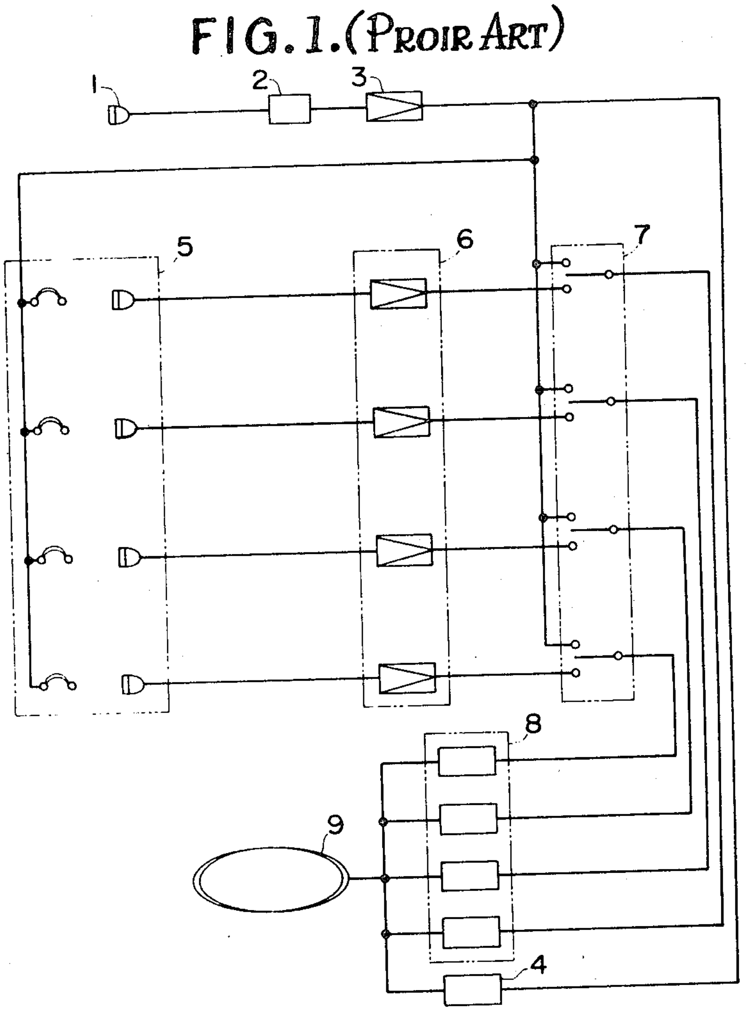
FIG. 1 is a basic wiring diagram of a conventional simultaneous translation system.

For the convenience of explanation the conventional practice will be described referring to FIG. 1 illustrating the wiring of a conventional simultaneous translation system wherein the official languages are assumed to be four: English, French, Spanish and Russian.

Item 1 is a microphone for a speaker at the conference. The audio-signals transmitted through this microphone are selected at the mixer desk 2 and amplified to an adequate level of audio frequency by an amplifier 3 connected in series with the mixer desk 2. The amplifier is connected to the original transmitter 4 which transmits the original language in which the speaker is talking while at the same time these signals are transmitted to the interpreter booths 5. The interpreters listening to the speaker translate the speech of the latter and the translated speech at the booths 5 is transmitted from the loop antenna 9 through a transmitter 8 when the switch 7 is connected to the amplifier 6. When there is no need for interpretation at the booths 5, the switch 7 is connected to the amplifier 3 and the original speech is transmitted from the amplifier 3 via the switch 7 and the transmitter 8.

Thus the amplifier 3 for amplifying the audio-signals communicates with both the original transmitter 4 and the transmitter 8 for each official language for interpretation.

In the event the speaker talks in English, then, of course, the original transmitter 4 conveys an English speech and at the same time an exclusive English transmitter in the transmitter 8 conveys the same speech. In this case, the English interpreter booth is idle and the switch 7 is connected to the amplifier 3. Change over of the switch 7 is done by an input relay or a switching of a transistor bias.

In Europe and America the simultaneous translation system in common use is one in which the booths 5 in FIG. 1 are equipped with a control panel having a change-over switch which is turned by the interpreter every time the language of the speaker changes between English, French, Spanish and Russian or the mixer operator effects the change-over by pressing a push-button at his desk. This system has been introduced into Japan and it is popularly adopted at international conferences taking place in Japan. This conventional system would have no trouble in foreign countries where multi-lingual interpreters are easily available, but even under this system, if a Japanese speech happens and has to be translated, it is usually impossible to get any multi-lingual interpreter who can speak for instance Japanese, English, French and Spanish; and English will have to be taken as an intermediary to convey the Japanese speech.

If in the above case, the system is the conventional one illustrated in FIG. 1, the wiring will need a temporary modification which will inevitably be poor in reliability. As for the change-over of the device because of a change in the original language, operations of both the mixer operator and the interpreter will be involved thereby resulting in a complicated wiring which undoubtedly will cause an error and hamper smooth progress of conference.

Thus, the conventional simultaneous translation system is highly inconvenient for use at international conferences where an intermediary translation of an original speech delivered in a non-official language is required.

Figure 2:
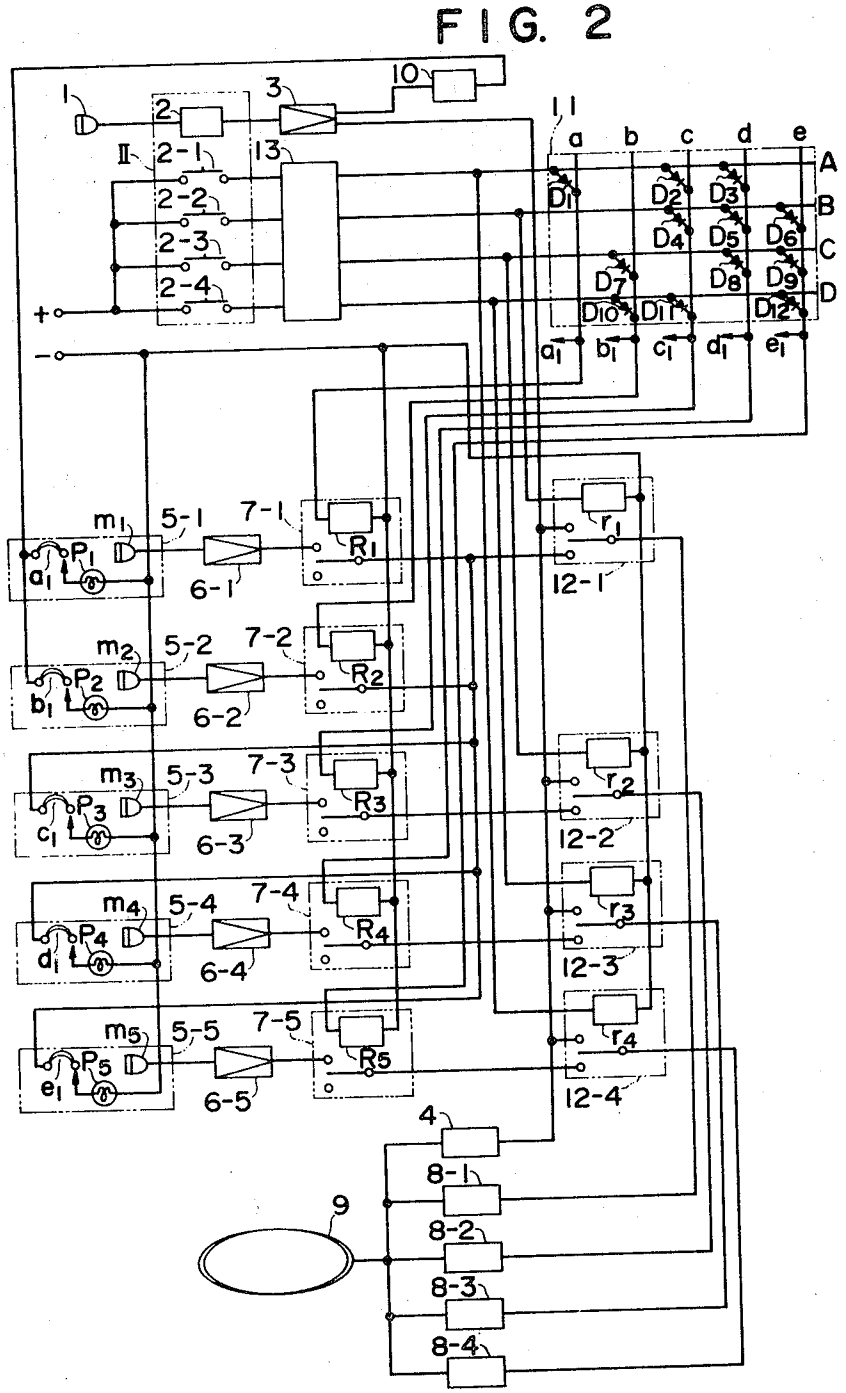
FIG. 2 is a circuit diagram illustrating an embodiment of the simultaneous translation system according to the present invention.

Referring to FIG. 2, a simultaneous translation system of this invention using a matrix circuit as the selective circuit is now to be described. The speech of a speaker at the conference is received through the microphone 1 and the audio-current thus received goes to the mixer desk 2 in the mixing room II and, after selected, it is sent to the amplifier 3. After amplified to an adequate level, the speech is sent to the original transmitter 4 and conveyed via the loop antenna 9 to the conference, while at the same time it goes via the monitor amplifier 10 connected to the amplifier 3 to the booths 5 – 1, 5 – 2, where it is listened to by the interpreters wearing earphones and sitting in the booths. These interpreters working in these booths take turns as the original language changes. The translated speech is transmitted to other interpreters sitting in the other booths 5 – 3, 5 – 4, 5 – 5 and the latter interpreters do their own translation work.

The mixing room II is equipped with switches 2 – 1, 2 – 2, 2 – 3 and 2 – 4, and between the lines A,B,C,D of the matrix circuit 11 and these switches 2 – 1 to 2 – 4 there is provided a hold-cancel circuit 13 which serves to hold a voltage in the lines A,B,C,D of the matrix circuit 11 when these switches 2 – 1 to 2 – 4 are in the on position.

Here, assume that in the matrix circuit 11 the line A represents the original Japanese, the line B the original English, the line C the original French, and the line D the original Spanish. Then the relays $R_1$, $R_2$, $R_3$, $R_4$ and $R_5$ are connected to the lines *a,b,c,d,e*, respectively, crossing the lines A to D, while the interpret order lamps $P_1$, $P_2$, $P_3$, $P_4$, $P_5$ are connected using the lines *a* to *e* as follows: $a_1$ — $a_1$, $b_1$ — $b_1$, $c_1$ — $c_1$, $d_1$ — $d_1$, $e_1$ — $e_1$. When energized, the relays $R_1$ to $R_5$ turn on the switches 7 – 1 to 7 – 5 connected via the amplifiers 6 – 1 to 6 – 5 to the microphones $m_1$ to $m_5$ in the booths 5 – 1 to 5 – 5, and thereby continuity with the booths 5 – 1 to 5 – 5 is established. In the drawing, the symbols + and – denote the power supply terminals of the system.

To ignite the interpret order lamps $P_1$ to $P_5$ at the booths whose interpreter service is needed, diodes are set at the junction of the horizontal and vertical lines in the matrix circuit. Upon ignition of the lamps $P_1$ to $P_5$, the interpreters sitting in the booths 5 – 1 to 5 – 5 begin to work. The translated speech goes into the microphones $m_1$ to $m_5$ provided in the booths 5 – 1 to 5 – 5, and after amplification by the amplifiers 6 – 1 to 6 – 5 and switched by the switches 7 – 1 to 7 – 5, it comes out in the conference room through the exclusive language transmitters 8 – 1 to 8 – 4 over different carrier frequencies. Thereby the translated speech becomes an input to the exclusive language transmitters 8 – 1 to 8 – 4 through the switches 12 – 1 to 12 – 4 which become continuous when the relays $r_1$ to $r_4$ connected respectively to the lines A to D of the matrix circuit 11 are energized.

Referring to FIG. 2, a case under this embodiment is described below where the official languages are Japanese, English, Spanish and French and an original speech is delivered in Japanese.

The original Japanese speech goes through the microphone 1 to the mixer desk 2 and after being amplified by the amplifier 3 it reaches the original transmitter 4, through which it is conveyed via the loop antenna to the conference room. On the other hand, it goes to the booth 5 – 1 through the monitor amplifier 10 connected to the amplifier 3. Thereby the switch 2 – 1 in the mixing room II is turned on to energize the hold-cancel circuit 13 and in consequence a voltage is applied on the line A of the matrix circuit 11. Even after the switch 2 – 1 turns off, the hold-cancel circuit 13 holds the line A of the matrix circuit 11 in a voltage-applied state, and the diode $D_1$ set at the junction of the line *a* crossing the line A of the matrix circuit 11 applies a voltage on the line *a*. When the relay $R_1$ connected to the line *a* is energized, the lamp $P_1$ in the booth 5 – 1 is ignited.

Upon ignition of the lamp $P_1$ the interpreter sitting in the booth 5 – 1 translates the Japanese speech into English. The English translation goes into the microphone $m_1$ and is amplified to an adequate level by the amplifier 6 – 1, while at the same time it goes to the switch 12 – 1 through the switch 7 – 1, which now communicates with the booth 5 – 1 as the result of the relay $R_1$ being energized. The relay $r_1$ of this switch 12 – 1 is connected to the line B of the matrix circuit 11, but the line B is not applied with any voltage. As a result, the relay $r_1$ remains non-energized. Thus, with the switch 12 – 1 becoming continuous with the booth 5 – 1, the speech is transmitted through the exclusive English transmitter 8 – 1 to the conference room.

The booth 5 – 2 is manned by an interpreter specializing in translation of the original French or Spanish into English. When the original speech is Japanese, service of booth 5 – 2 is not needed because the booth 5 – 1 translates the speech into English and the English-translated speech is conveyed to the conference site.

Namely, the junction of the lines A and *b* of the matrix circuit 11 requires no diode insertion and accordingly the line *b* of the matrix circuit 11 will not be applied with any voltage. Thus, with the relay $R_2$ non-energized, the microphone $m_2$ and the amplifier 6 – 2 wired to the booth 5 – 2 remain cut off from the switch 12 – 1. The lamp $P_2$ connected to the line *b* does not light up in booth 5 – 2 and the interpreter in the booth 5 – 2 knows that his service is needed.

To the booth 5 – 3 is assigned an interpreter specializing in translation of the original English or Spanish into French. In this booth, the diode $D_2$ set at the junction of the lines A,*c* of the matrix circuit 11 causes the line C to be applied with a voltage and in consequence the lamp $P_3$ connected to the line C is ignited, while at the same time the relay $R_3$ of the switch 7 – 3 is energized.

Upon ignition of the lamp $P_3$ the interpreter in the booth 5 – 3 begins to work, in this case, listening through the earphone to the English translation of the original Japanese obtained at the booth 5 – 1, and then translating it into French.

The French-translated speech goes into the microphone $m_3$, amplified adequately by the amplifier 6 – 3, and reaches the switch 12 – 2 through the switch 7 – 3 which is continuous with the booth 5 – 3 as a result of the relay $R_3$ being energized.

The relay $r_2$ in the switch 12 – 2 is connected to the line C of the matrix circuit and because of the line C being applied with no voltage, it remains non-energized. Thus, with the continuity of the switch 12 – 2 with the booth 5 – 3 being maintained, the audio signal which has gone into the switch 12 – 2 is conveyed through the exclusive French transmitter 8 – 2 to the conference room.

The booth 5 – 4 has an interpreter who translates the original English into Spanish. The connection circuit in the booth 5 – 4 acts like the one in the booth 5 – 3.

Namely, the current flows in the direction of the diode $D_3$ set at the junction of the line *d* intersecting the line A of the matrix circuit 11 under voltage, and accordingly, the line *d* is applied with a voltage resulting in ignition of the lamp $P_4$ located in the booth 5 – 4. Upon ignition of the lamp $P_4$, the interpreter in the booth 5 – 4 translates the English translation obtained in the booths 5 – 1, 5 – 3 into Spanish. The Spanish translation thus obtained goes into the microphone $m_4$, and being transmitted through the amplifier 6 – 4 and the switches 7– 4, 12 – 4, it is conveyed to the conference site by the exclusive Spanish transmitter.

The booth 5 – 5 is occupied by an interpreter who translates English into Japanese and in this case with the original speech being in Japanese, the service of the booth 5 – 5 is not needed. Therefore no diode is set at the junction of the lines A, *e* in the matrix circuit 11. Thus, with the line *e* under no voltage, the lamp $P_5$ remains non-ignited and the service of the booth 5 – 5 is not called for. Thereby, since the relay $r_4$ is connected to the line A under voltage, the switch 12 – 4 is continuous with the amplifier 3 and the original Japanese speech is transmitted to the conference room through the exclusive Japanese transmitter 8 – 4.

As described above, when the original speech is in Japanese, the matrix circuit 11 is set to the line A. When the speech is in English, the circuit is set to the line B, and when in French it is set to the line C. Also when the speech is in Spanish, it is set to the line D. Thus, if the original language changes to English, the switch 2 – 2 in the mixing room II is turned on, and a voltage is applied on the line B of the matrix circuit 11. Then with the diodes $D_4$,$D_5$,$D_6$ set at the junctions of the lines *c,d,e* with the line B, the French, Spanish and Japanese translation services at the booths 5 – 3, 5 – 4, 5 – 5 are called for. If the original is French, the switch 2 – 3 is turned on to apply a voltage on the line C whereby the diodes $D_7$,$D_8$,$D_9$ are set at the junctions of the lines *b,c,d*, and the English, Spanish and Japanese services at the booths 5 – 2, 5 – 4, 5 – 5 are called for. Similarly, when the original is Spanish, a voltage is applied on the line D, and with the lines *b,c,e* applied with a voltage through the diodes $D_{10}$,$D_{11}$,$D_{12}$, the English, French and Japanese interpreters at the booths 5 – 2, 5 – 3, 5 – 5 are called upon for service.

Thus, the original language rendered into the other official languages is transmitted over waves of different carrier frequencies to the conference site and the attendees of the conference can listen to the speech in a language they want through their receivers tuned to the carrier frequency of the language they select.

Thus, the conference can proceed smoothly with each of the attendees hearing in his mother tongue the speech being delivered which would otherwise be unintelligible to him.

Even if an international conference needs an intermediary translation of a non-official language, smooth interpretation will be possible when the simultaneous translation system according to the present invention is adopted. Under this system which is easy to operate and can be readily installed and designed small and light weight, any original which is hard to identify can be identified by quick switching between different booths if each booth is equipped with switches 2 – 1, 2 – 2, 2 – 3, 2 – 4 of the mixing room II.

Meanwhile, installation of an interpret order lamp in each booth has the effect of the interpreter in each booth being able to start work upon ignition of the lamp.

What is claimed is:

1. A simultaneous translation system comprising a first transmission circuit for transmitting an input audio-signal from a master microphone to a transmitter, booths to which the audio-signal is transmitted, a first switch for switching an input audio-signal from an auxiliary microphone in each booth to a second switch means, and a second transmission circuit for selecting either said input audio-signal from said master microphone or said input audio-signal from the auxiliary microphone by said second switch means and transmitting it to the transmitter, the system being characterized by said second switch means worked by a voltage applied on the horizontal line of a selective circuit connected to a hold-cancel circuit and said first switch worked by a voltage applied on the vertical line of the selective circuit.

2. A simultaneous translation system comprising a first transmission circuit for transmitting an input audio-signal from a master microphone to a transmitter, booths to which the audio-signal is transmitted, each booth including an interpret order lamp, a first switch for switching an input audio-signal from an auxiliary microphone in each booth to a second switch means, and a second transmission circuit for selecting said input audio-signal from the master microphone by said second switch means, the system being characterized by said second switch means worked by a voltage applied on the horizontal line of a selective circuit connected to a hold-cancel circuit and said first switch, associated with each booth, worked by a voltage applied on one of a plurality of vertical lines of the selective circuit with the vertical lines connected to the interpret order lamps.

* * * * *